(12) United States Patent
Backes

(10) Patent No.: US 7,902,493 B2
(45) Date of Patent: Mar. 8, 2011

(54) ROTATION ANGLE TRANSMITTER AND METHOD OF SCANNING A CODE DISC OF A ROTATION ANGLE TRANSMITTER

(75) Inventor: Ulrich Backes, Radolfzell (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 1821 days.

(21) Appl. No.: 11/034,468

(22) Filed: Jan. 13, 2005

(65) Prior Publication Data

US 2005/0151070 A1 Jul. 14, 2005

(30) Foreign Application Priority Data

Jan. 14, 2004 (DE) .................. 10 2004 001 996
Jul. 23, 2004 (DE) .................. 20 2004 011 508 U

(51) Int. Cl.
*G01D 5/34* (2006.01)
*G11B 3/70* (2006.01)

(52) U.S. Cl. .......... 250/231.13; 250/231.14; 250/231.18; 369/276

(58) Field of Classification Search ............. 250/231.13–231.18, 237 R, 237 G; 341/11, 13, 31; 369/32, 43, 44, 46, 59, 124, 369/275, 276; 356/614, 616

See application file for complete search history.

(56) References Cited

U.S. PATENT DOCUMENTS

| | | | |
|---|---|---|---|
| 4,225,931 A | 9/1980 | Schwefel | |
| 4,335,306 A | 6/1982 | Gort et al. | |
| 6,501,069 B2 | 12/2002 | Blasing | |
| 6,888,126 B2 * | 5/2005 | Blasing et al. | 250/231.13 |
| 2003/0052262 A1 | 3/2003 | Blasing et al. | |

FOREIGN PATENT DOCUMENTS

| | | |
|---|---|---|
| DE | 2729697 | 1/1979 |
| DE | 4014479 | 11/1990 |
| DE | 4220502 | 12/1993 |
| DE | 4302076 | 8/1994 |
| DE | 4439693 | 4/1997 |
| DE | 19604502 | 8/1997 |
| DE | 3322897 | 5/1998 |
| DE | 19855064 | 5/2000 |
| DE | 19944005 | 3/2001 |
| DE | 10006675 | 5/2002 |
| DE | 10143662 | 3/2003 |
| EP | 0478394 | 4/1992 |
| EP | 0635700 | 1/1995 |
| WO | 92/04776 | 3/1992 |

\* cited by examiner

*Primary Examiner* — Georgia Y Epps
*Assistant Examiner* — Don Williams
(74) *Attorney, Agent, or Firm* — Tarolli, Sundheim, Covell & Tummino LLP

(57) ABSTRACT

An optical rotation angle transmitter includes a code disc that has a digital coding and an analog coding. The digital coding has multiple tracks and is configured so as to be secure against error. A current angle interval can be determined from a plurality of possible angle intervals by means of the digital coding, and a precise angle position of the code disc can be determined within the current angle interval by means of the analog coding. Each of the tracks of the digital coding has a light sensor associated with it. Further provided is a method of scanning a code disc of a rotation angle transmitter.

21 Claims, 5 Drawing Sheets

ROTATION ANGLE TRANSMITTER AND METHOD OF SCANNING A CODE DISC OF A ROTATION ANGLE TRANSMITTER

TECHNICAL FIELD

The invention relates to an optical rotation angle transmitter, in particular to a rotation angle transmitter as can be used in a steering angle sensor of a motor vehicle. The invention further relates to a method of scanning a code disc of a rotation angle transmitter.

BACKGROUND OF THE INVENTION

From the prior art, various absolutely operating optical angle transmitters are known, which are based on the transparent or reflecting scanning of a code disc with digital tracks (see for example DE 198 55 064 and DE 199 44 005). Such rotation transmitters require log 2(N) code tracks for N angle positions which are to be represented. With limited structural space, the aperture width for each light sensor therefore decreases by 1/log 2(N). At the same time, the aperture height decreases with 1/N. The aperture area (and hence the amount of light available for each light sensor) therefore decreases with 1/(N*log 2(N)), which greatly limits the accuracy able to be technically achieved.

To secure such rotation transmitters against any defects which may occur, such as for example a damaged code disc, further steps become necessary. One approach consists in a dual configuration of the required tracks for security. These steps, however, additionally intensify the light quantity problem. The purely digital sensors have, in addition, the disadvantage that the application of the codes has to be carried out equally accurately for all tracks.

Absolute angle transmitters are also known which are based on a purely analog scanning of a code disc (see for example DE 101 43 662). These angle transmitters have the disadvantage, however, that the analog track must be produced very accurately over a relatively large distance. The range of modulation of such transmitters is limited, and the required accuracy of the analog-to-digital converters connected downstream is relatively high. The solution approach of calibrating the transmitter once by means of a sufficiently great number of points along a relatively inaccurately produced track, and then interpolating in running operation along the calibration values which were found, fails in practice due to the ageing of the components involved.

From DE 196 04 502 a rotational transmitter is known in which a series of Gray code tracks is used and which achieves a refined angle accuracy by means of a sawtooth-shaped analog track. This arrangement has the disadvantage that at the points of change of the sawtooth, it produces the same brightness as in the centre of a tooth. Thereby, an ambiguity of the angle which is to be read out exists. In addition, it is not reliably protected against damage to the code tracks.

From DE 40 14 479 an angle transmitter is known which uses a series of binary code tracks and achieves a refined angle accuracy by means of an analog track. This arrangement has the substantial disadvantage that it is not reliably protected against damage to the code tracks. Furthermore, the analog track used, which is limited in a sinusoidal shape in the core, is not optimally formed for the improvement of the angle accuracy, because in particular in the immediate environment of the maximum or minimum of the light intensity, the gradient is almost zero.

From DE 100 06 675 a path or angle measurement arrangement is known, which has several Gray-coded digital tracks and an analog track rising or respectively falling in width continuously synchronously therewith. The scanning takes place by means of a regular arrangement of a plurality of light sensors, the spacing of which from each other is distinctly smaller than the analog track width. This arrangement has the disadvantage that the resolution improvement which is able to be achieved is limited by the number of light sensors allotted to the analog track width. With a relatively high required improvement to the accuracy, this technology only becomes attractive with a clear drop in price of the required light sensor array. Alternatively, the width of the analog track would have to be increased, which can lead to illumination problems and, in addition, burdens the structural space. A further disadvantage of the described arrangement is that with maximum utilization of the angle interval (between two digital code jumps) which is available for resolution improvement, to avoid ambiguities of the scanning values it requires a second track of the same kind and phase-displaced.

It is the object of the invention to provide a rotation transmitter and a method of scanning a code disc of a rotation transmitter which, using as few code tracks as possible, can achieve as high an accuracy as possible and in which the requirements for production accuracy are reduced as far as possible.

BRIEF SUMMARY OF THE INVENTION

According to the invention, this is achieved in an optical rotation angle transmitter comprising a code disc that has a digital coding and an analog coding. The digital coding has multiple tracks and is configured so as to be secure against error. A current angle interval can be determined from a plurality of possible angle intervals by means of the digital coding, and a precise angle position of the code disc can be determined within the current angle interval by means of the analog coding. Each of the tracks of the digital coding has a light sensor associated with it. In this way, a particularly low manufacturing expenditure results. Owing to the digital coding, secure against error, additional code tracks which serve for security are not necessary.

According to a preferred embodiment of the invention, a processing system is provided in which maximum or respectively minimum scanning values of the analog coding can be stored as interpolation reference. In this way, any measured value deviations which are due to changes, as caused by age, in the components of the rotation angle transmitter can be prevented.

In an advantageous aspect of the invention, provision is made that the digital code tracks partly overlap following phase shifts. The number of code tracks required can thus be further reduced, resulting in reduced structural dimensions.

According to the invention, the above-mentioned object of the invention is further achieved by a method of scanning a code disc of a rotation angle transmitter having a digital coding and an analog coding. A current angle interval can be determined from a plurality of possible angle intervals by means of the digital coding, and a precise angle position of the code disc can be determined within the current angle interval by means of the analog coding. The analog coding has maxima and minima in succession. The analog coding is scanned and a maximum or minimum scanning value that is found is stored as an interpolation reference in a processing system. In regard to the advantages that can be achieved by this method, reference is made to the above explanations.

DETAILED DESCRIPTION OF THE PREFERRED EMBODIMENTS

Figure 1:
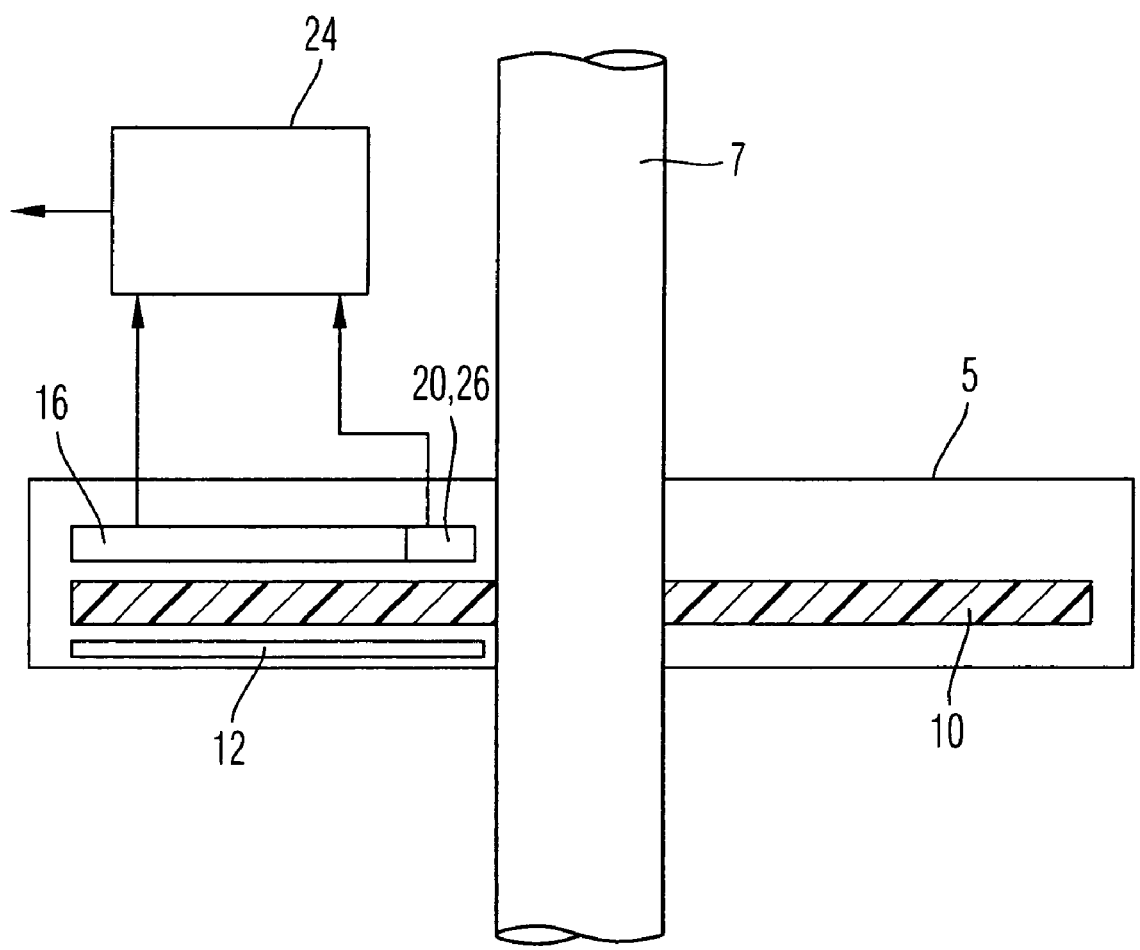
FIG. 1 shows a cross-section through a rotation angle transmitter.

In FIG. 1 a rotation angle transmitter 5 is shown, which is part of a steering angle sensor. The steering angle sensor serves to determine the angle position of a diagrammatically indicated steering shaft 7.

Figure 2:
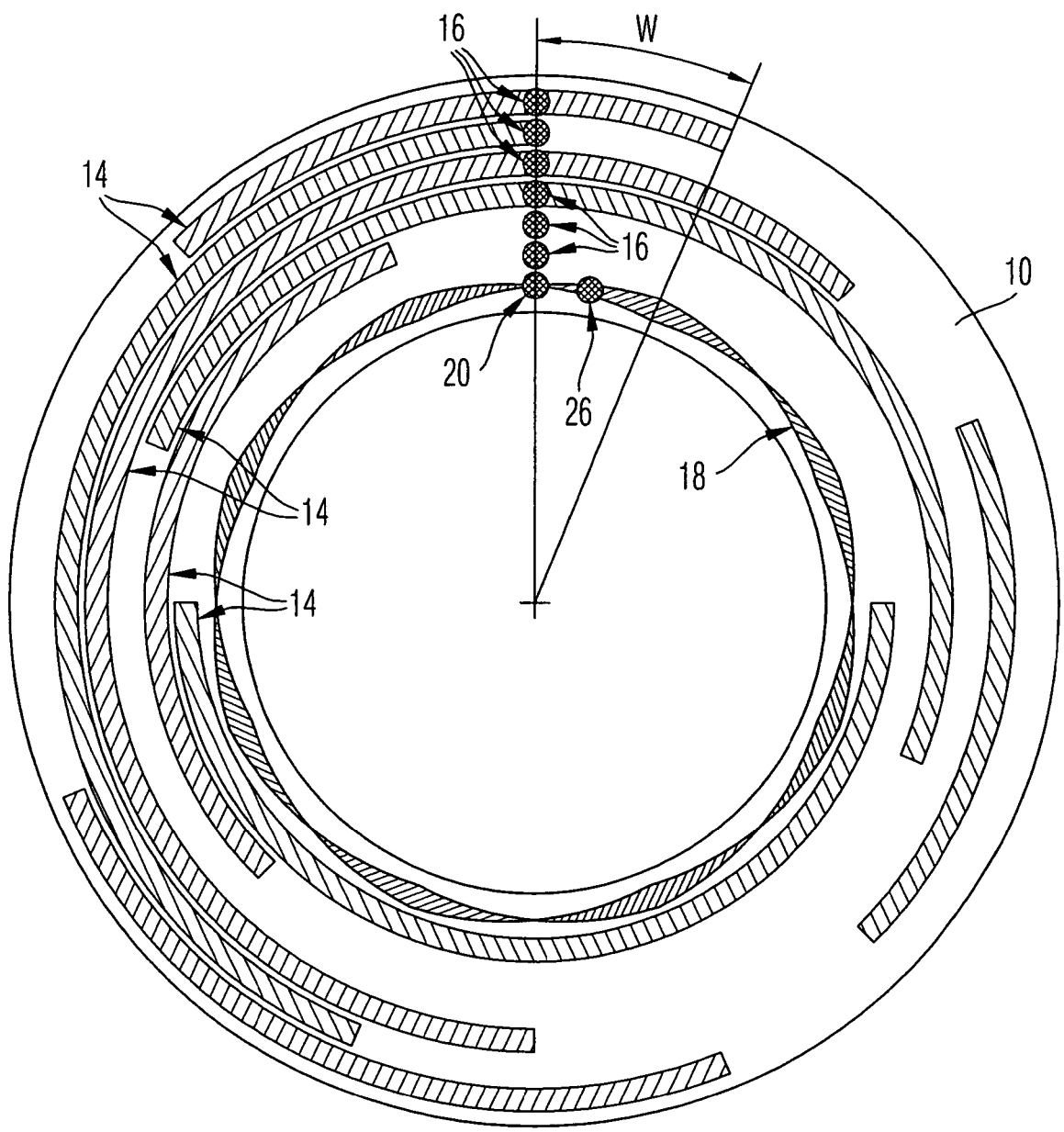
FIG. 2 shows a diagrammatic top view onto a code disc and associated light sensors according to a first embodiment, which may be used in the rotation angle transmitter of FIG. 1.
Figure 3:
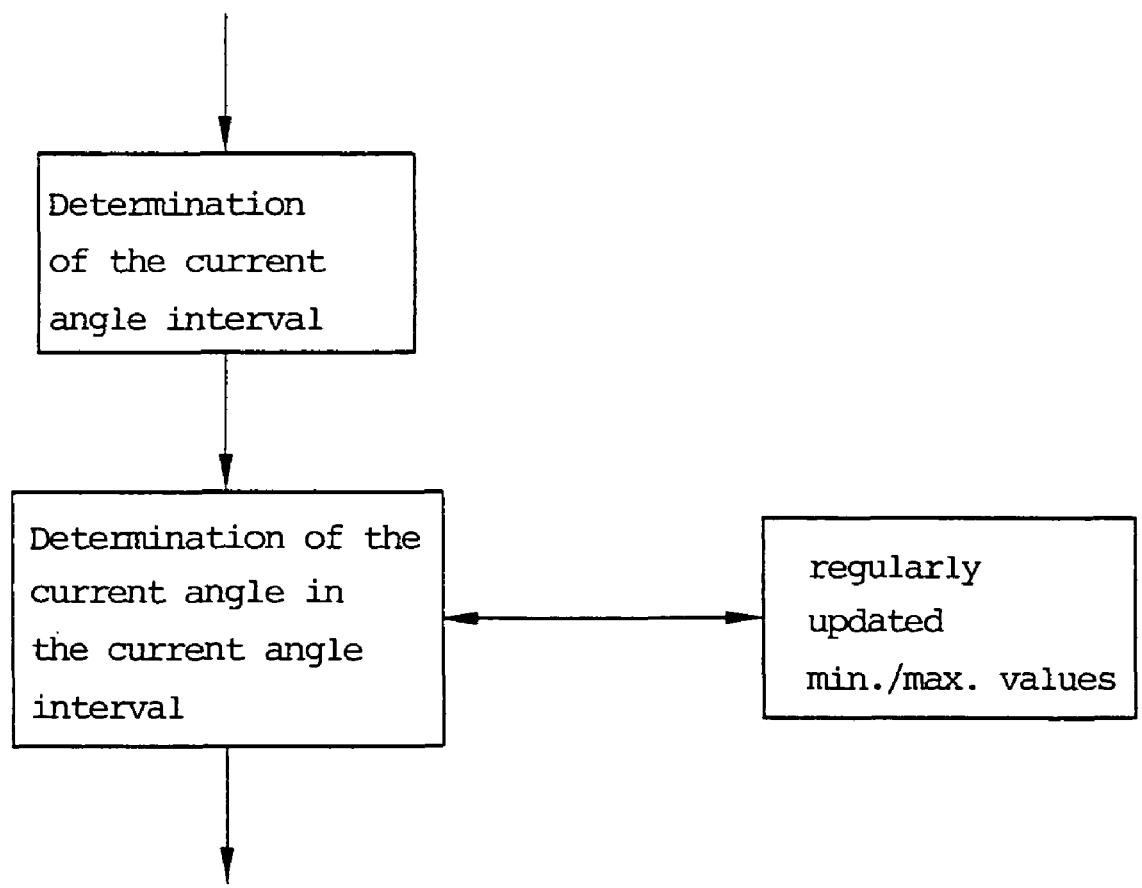
FIG. 3 shows diagrammatically the sequence of an angle determination.

The rotation angle transmitter has a code disc 10 (see also FIG. 2), which is connected with the steering shaft 7 so as to rotate jointly therewith. The code disc 10 consists of plastic and is constructed so as to be transparent in the example embodiment shown. On the code disc, different code tracks are arranged, which make possible two kinds of angle determination, namely on the one hand a differentiation of various angle intervals W and on the other hand an angle determination within one of these angle intervals (see also FIG. 3). The code tracks are illuminated by a diagrammatically shown light source 12.

For differentiation between various angle intervals W, several series of digital code tracks 14 are provided. "Digital" means here that each code track 14 provides digital information to a light sensor 16 associated with it, for example light passage or light absorption or else light reflection or light absorption. The coding of the code tracks 14 can therefore consist of a light-absorbing material or else of a reflecting material. In the example embodiment shown, the code disc 10 is divided into 16 angle intervals W and has six digital code tracks 14. It is obvious that a higher number of angle intervals W could also be used.

For reasons of security against error, a special arrangement of the digital code tracks 14 is used in which for each progressive angle position respectively precisely one track changes its state. Therefore, a single fault (i.e. damage to a code track in any angle position) leads at the most to the issue of an angle error in the magnitude of an angle interval. Any defects other than a single fault are recognized directly as a code not occurring on the disc. This allows a doubling of the code tracks, for security against defects, to be dispensed with.

To establish the precise angle position within an angle interval W, in addition to the digital code tracks 14, an analog code track 18 is provided. "Analog" means here that the information able to be read out from this code track can assume a plurality of discrete values. The analog code track 18 changes continuously within an angle interval W. In the example embodiment shown here, a code track 18 is used the width of which increases linearly continuously in an angle interval W and as from the change to the next angle interval W decreases again linearly continuously. The analog code track 18 is scanned by a light sensor 20. Depending on the embodiment, the analog code track 18 is constructed so as to be impermeable to light or permeable to light.

Each maximum (or minimum) scanning value of the analog code track 18 which is found is stored as an analog reference for the respective associated angle interval W in a processing system 24 connected downstream. The precise angle between a maximum and an adjacent minimum in the angle interval W is then determined by interpolation.

The maximum or minimum scanning values of the analog code track 18 can be regularly updated in the operation of the rotation angle transmitter. With this constantly recalibrating method, it is achieved that the ageing of the components involved only plays a subordinate role. In addition, the requirements for the linearity of the analog track are limited to the relatively small region within an angle interval W. The demands made on the accuracy of the analog-to-digital converter connected downstream are likewise limited to the division of the angle interval W into the desired angle accuracy.

For security against analog track defects, the analog track 18 is scanned with a further sensor 26, offset by an angle in relation to the first sensor 20. This angle preferably amounts to half of the angle interval W, plus an integral multiple of this angle interval. Since for each angle in the angle interval W, only specific scanning value pairs of the sensors 20, 26 are permissible, damage to the analog track is thereby able to be reliably recognized. In addition, the current angle interval can thus be distinguished from the adjacent angle interval even without digital track information. Thereby, even such damage to the digital track is able to be detected which produces an angle error in the magnitude of an angle interval.

Figure 4:
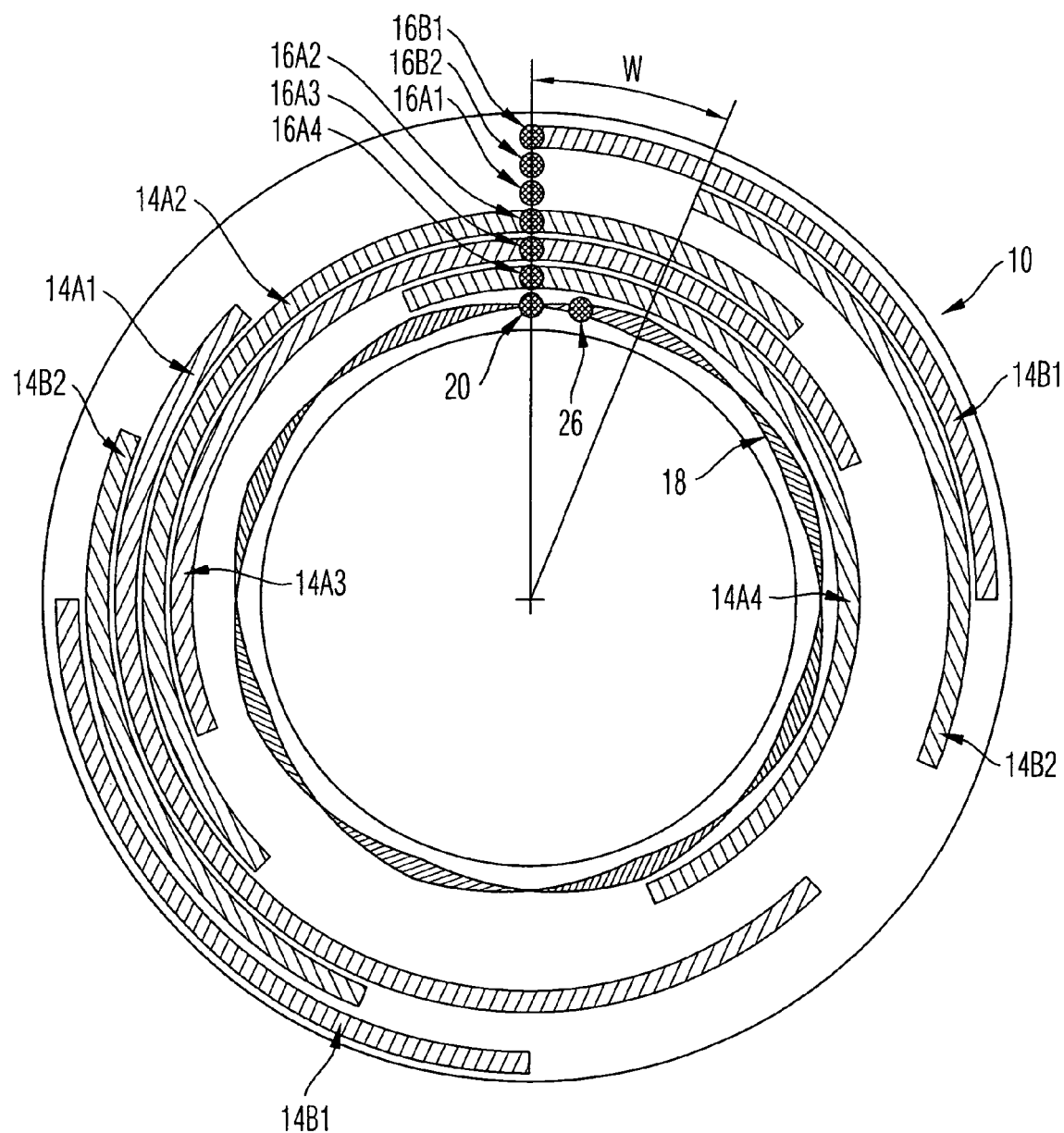
FIG. 4 shows a diagrammatic top view onto a code disc and associated light sensors according to a second embodiment, which serves to explain FIG. 5.
Figure 5:
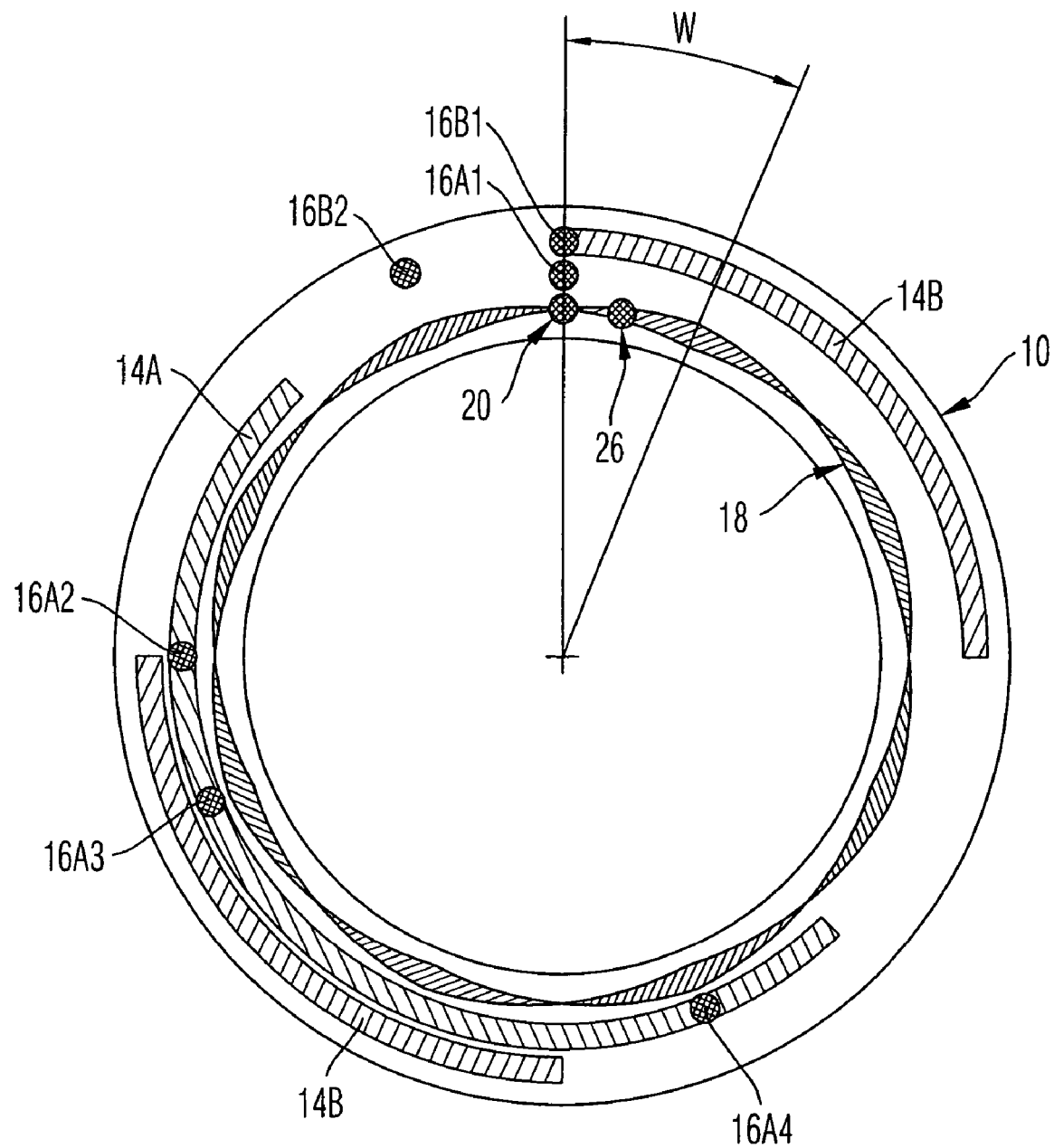
FIG. 5 shows a diagrammatic top view onto a code disc and associated light sensors according to a third embodiment.

FIG. 4 shows a code disc 10 and light sensors 16A1 to 16A4 as well as 16B1 and 16B2 associated therewith, for a rotation angle transmitter in accordance with a second embodiment, which merely serves to explain the code disc and the sensors associated with it shown in FIG. 5. The code disc 10 according to FIG. 4 is, again, divided into 16 angle intervals W and, just like the code disc 10 of FIG. 2, has six digital code tracks 14A1 to 14A4 as well as 14B1 and 14B2, which are present in an alternative arrangement; here, again, for each progressive angle interval W respectively precisely one track changes its state. Otherwise, the code disc 10 is identical with the code disc shown in FIG. 2 and may be used identically in order to determine the exact angle position of a steering shaft. As can be seen in FIG. 4, the arrangement of the digital code tracks 14A1 to 14A4 and the arrangement of the tracks 14B1 and 14B2 is selected exactly such that when shifted by an integral multiple of the angle interval W each, the respective code tracks designated by the same letter will overlap each other. For example, the code track designated by 14B2, which consists of two sections, has the same position as the code track designated by 14B1, likewise consisting of two sections, after the entire code track 14B2 was rotated counterclockwise by one angle interval. Now, that is, when only the code track 14B2 is turned in the manner described, accompanied by the sensor 16B2 associated with it having to be turned with it correspondingly, the two tracks 14B1 and 14B2, which are now directly superimposed, may be combined physically to form one single track 14B (again consisting of two sections) (FIG. 5). Associated therewith are now two sensors 16B1 and 16B2, shifted by one angle interval W in relation to each other, whereby the structural space required by the code disc 10 may be reduced without any loss of information whatsoever.

A further reduction in structural space is possible by likewise shifting the code tracks designated by 14A1 to 14A4 relative to each other and by combining them into one single code track 14A following these phase shifts, with a corresponding shift of the sensors 16A1 to 16A4 associated with the code tracks being simultaneously performed here as well. The code disc 10 formed in this way, having a decreased number of code tracks, inclusive of the associated sensors 16A1 to 16A4 as well as 16B1 and 16B2, is illustrated in FIG. 5. It offers the advantage of a greatly reduced structural space while maintaining the security against errors of the code disc illustrated in FIG. 2, and also of a distinctly diminished manufacturing expenditure.

The invention claimed is:

1. An optical rotation angle transmitter comprising
a code disc that has a digital coding and an analog coding, said digital coding having multiple tracks and being configured so as to be secure against error,
a current angle interval being able to be determined from a plurality of possible angle intervals by means of said digital coding,
a precise angle position of said code disc being able to be determined within said current angle interval by means of said analog coding, each of said tracks of said digital coding having a light sensor associated with it, and
a processing system in which maximum and minimum scanning values of said analog coding are stored as an interpolation reference for a respective associated angle interval so that the precise angle position of the code disc within the current angle interval can be determined by interpolation of the information obtained from the analog coding in the processing system.

2. The rotation angle transmitter according to claim 1, wherein said digital coding is formed by several digital code tracks.

3. The rotation angle transmitter according to claim 2, wherein said digital code tracks partly overlap following phase shifts.

4. The rotation angle transmitter according to claim 3, wherein said overlapping digital code tracks are physically combined to form one single digital code track.

5. The rotation angle transmitter according to claim 4, wherein said light sensors associated with said combined digital code tracks are arranged along a corresponding single digital code track.

6. The rotation angle transmitter according to claim 5, wherein said light sensors arranged along said single digital code track have an arrangement that corresponds to said phase shifts.

7. The rotation angle transmitter according to claim 3, wherein each phase shift corresponds to an integral multiple of one of said angle intervals.

8. The rotation angle transmitter according to claim 1, wherein said analog coding is formed by an analog code track.

9. The rotation angle transmitter according to claim 8, wherein said analog code track has a width that decreases within one angle interval and increases in a subsequent angle interval.

10. The rotation angle transmitter according to claim 8, wherein said analog code track has a width that increases within one angle interval and decreases in a subsequent angle interval.

11. The rotation angle transmitter according to claim 10, wherein said width changes continuously within one angle interval.

12. The rotation angle transmitter according to claim 8, wherein associated with said analog code track are two light sensors which are offset by an angle in relation to each other.

13. The rotation angle transmitter according to claim 8, wherein the analog code track is scanned by a first light sensor and a second light sensor to obtain a scanning information pair indicative of the precise angle position.

14. The rotation angle transmitter according to claim 1, wherein said code disc is constructed so as to be transparent and said digital and analog codings are one of permeable to light and light-absorbing, depending on their state.

15. The rotation angle transmitter according to claim 1, wherein said code disc is constructed so as to be impermeable to light and said digital and analog codings are one of light-reflecting and light-absorbing, depending on their state.

16. A steering angle sensor comprising a rotation angle transmitter according to claim 1.

17. A method of scanning a code disc of a rotation angle transmitter, having a digital coding and an analog coding, a current angle interval being able to be determined from a plurality of possible angle intervals by means of said digital coding, and a precise angle position of said code disc being able to be determined within said current angle interval by means of said analog coding, said analog coding having maxima and minima in succession, wherein said analog coding is scanned and one of a maximum and minimum scanning value that is found is stored as an interpolation reference for a respective associated angle interval in a processing system, the precise angle position within said current angle interval being determined by interpolation of an information obtained from said analog coding.

18. The method according to claim 17, wherein said maximum and minimum scanning values of said analog coding are updated during operation of said rotation angle transmitter.

19. The method according to claim 17, wherein an information obtained from said digital coding is checked for plausibility using said current angle interval.

20. The method according to claim 19, wherein when there is an error of said digital coding on the order of an angle interval, it is determined in which angle interval said code disc is located by reading out said analog coding.

21. The method according to claim 17, wherein the analog code track is scanned by a first light sensor and a second light sensor to obtain a scanning information pair, the precise angle position within said current angle interval being determined by interpolation of the scanning information pair.

* * * * *